United States Patent Office 3,433,056
Patented Mar. 18, 1969

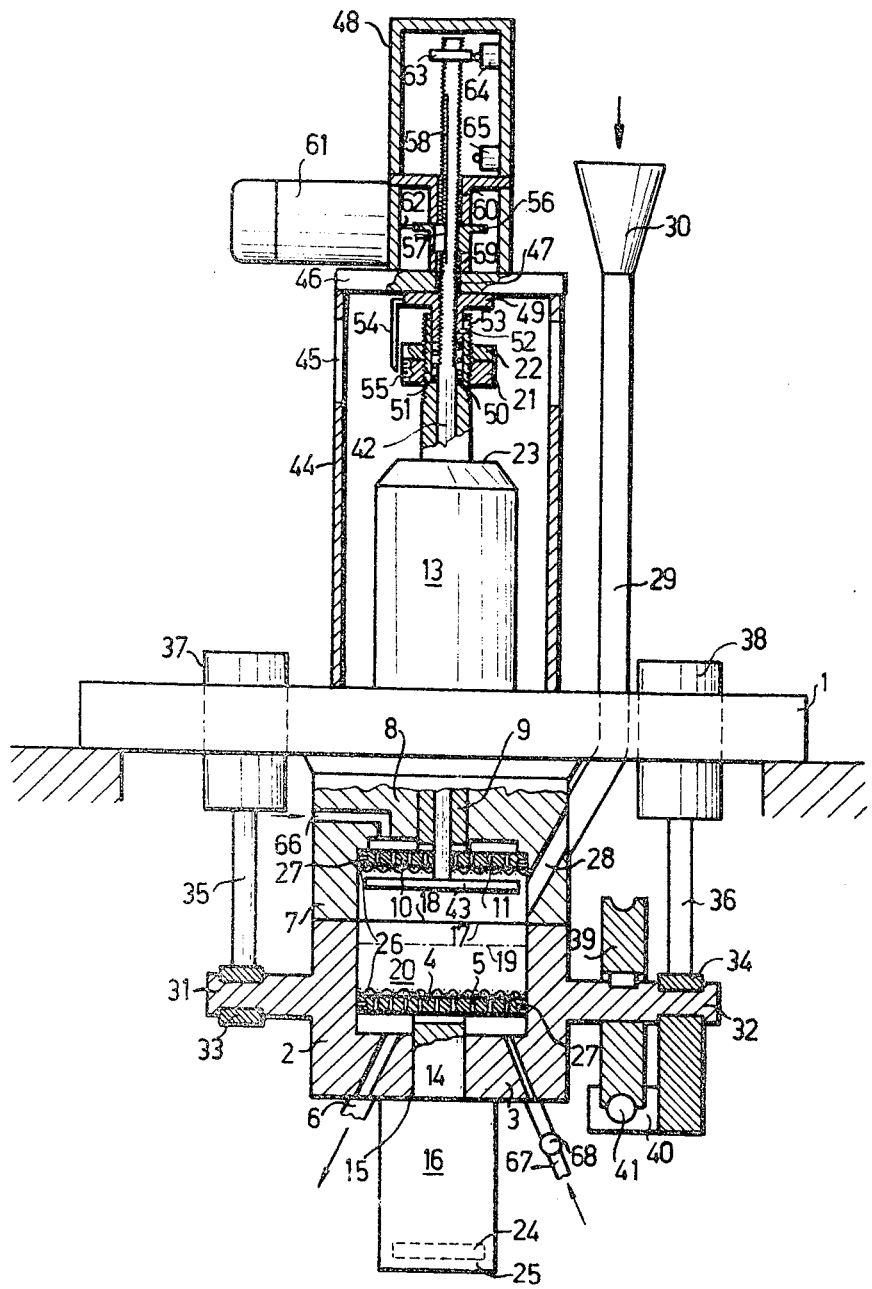

3,433,056
PERMEABILITY CELL
Hansrudolf Bruni, Brugg, and Heinz Nyffenegger,
Villnachern, Switzerland, assignors to Cement-
fabrik Holderbank-Wildegg AG, Holderbank,
Aargau, Switzerland, a corporation of Switzerland
Filed Nov. 4, 1966, Ser. No. 592,115
Claims priority, application Switzerland, Nov. 11, 1965,
15,598/65
U.S. Cl. 73—38                        4 Claims
Int. Cl. G01m 3/00

ABSTRACT OF THE DISCLOSURE

In apparatus for measuring the gas permeability of a specimen of material, a permeability cell receives the specimen. The cell includes a vertical hollow cylinder in the flow path of the measuring gas. The cylinder is provided with top and bottom screen plates between which the specimen, which has a prescribed weight, is pressed to impart to it a prescribed size and shape. The upper plate is movable out of the cylinder to permit removal and introduction of the material tested. The lower plate is movable to a position near the upper end of the cylinder to eject a tested specimen. In test position in the cylinder the plates are separated by a prescribed distance and confine the specimen between them. A stirrer is associated with one of the screen plates and serves to homogenize the specimen prior to its being pressed to final dimensions.

This invention relates to a permeability cell having a cylinder through which measuring gas flows and two gas-permeable screen plates substantially perpendicular to the cylinder axis. The screen plates are for compressing a pellet of test material and are constructed to be each moved in a filling position and, against one another, in a pressing position at a prescribed distance from one another. In the pressing positions they axially limit a pellet chamber of prescribed volume and are held in these pressing positions. The space lying on that side of one of the screen plates which is remote from the pellet chamber is connected to a measuring gas connection and one of the screen plates being in addition constructed to be moved into a withdrawal position for freeing that end of the cylinder which is associated with it.

It is known the pellet pressed from test material in a permeability cell of the type set forth may be removed by being blown out by means of gas under pressure after completing the permeability measurement. For this purpose, after movement of one of the screen plates into its withdrawal position, in which it frees that end of the cylinder which is associated with it, gas under pressure is admitted to the other end of the cylinder and is blown through another screen plate in the direction towards the freed end of the cylinder, the pellet or the test material which the said pellet has formed being removed from the cylinder.

It has been proved that it is not possible in this way completely to remove with certainty the test material which is in the cylinder. Any such residue of pellet adversely affects the measurement results obtained in the following measurements, since a larger quantity than corresponds to the prescribed test material quantity is compressed into a pellet, and this pellet, since a larger quantity of material is pressed to a prescribed volume, has a different porosity, and this means a different ratio between solid volume and total volume. As well as a constant difference pressure, a constant quantity of test material and a constant porosity of the pellet constitute a preliminary requirement for the accuracy of the permeability measurement, which depends on measuring the throughflow time of a prescribed quantity of measuring gas through the pellet. In addition, the known method of removing the pellet from the cylinder causes an undesirable dust formation in the surroundings.

The invention has for its object to overcome these disadvantages. For this purpose, a permeability cell of the type hereinbefore set forth, in which one of the screen plates is constructed to be movable into a withdrawal position freeing that end of the cylinder which is associated with it, is so constructed according to the invention that, for ejecting the pellet from the cylinder, the other screen plate is constructed to be movable in a direction towards the pellet chamber beyond its pressing position into an ejection position.

A permeability cell is shown in simplified form and partly in section in the drawing as one constructional example of the invention.

The permeability cell which is illustrated comprises a base plate 1, from which is suspended a vertical, upwardly open cylinder 2, which is closed at the bottom by an end wall 3. Arranged in the lower region of the cylinder 2 is a screen plate 4 which is gas-permeable in the direction of the cylinder axis and is disposed perpendicular to said axis, said plate comprising a large number of uniformly distributed screen apertures 5. A measuring gas connection 6 extends outwardly through the end wall 3 from the space beneath the screen plate 4. Adjacent to the upwardly open cylinder 2 is a bushing 7, which is closed at the upper end by a cover 8. The bushing 7 is flush with the cylinder 2. Extending through openings not shown in the drawing and formed in the cover 8 and in the base plate 1 is a piston rod 9, which carries at its lower end a screen plate 10 which is gas-permeable axially of the cylinder and which has a large number of uniformly distributed screen apertures 11. Above the base plate 1, the piston rod 9 extends through a pneumatic servo motor 13 to which there is admission at both ends and by means of which the screen plate 10 is movable axially of the cylinder. The screen plate 4 is disposed on the upper end of a piston rod 14, which extends through an opening 15 in the end wall 3 of the cylinder 2 into a pneumatic servo motor 16 to which there is admission at both ends and by means of which the screen plate 4 is movable axially of the cylinder.

In the drawing, the screen plate 4 is shown in its pressing position, which is at the same time its filling position. The screen plate 10 is shown in the drawing in its filling position, which is at the same time its withdrawal position. In this withdrawal position, the screen plate 10 is situated outside the cylinder 2 and uncovers the opening 17 which is associated therewith and which is on the end opposite the end wall 3 closing it at the lower end, the said opening 17 connecting directly with the opening 18 of the bushing 7 which is opposite the cover 8.

The screen plate 10 is movable from its filling and withdrawal position by means of the servo motor 13 into the interior of the cylinder 2 and against the screen plate 4 into a pressing position. The position of the lower edge of the screen plate 10 in its pressing position is represented by a dash-dotted line 19 in the drawing. The screen plate 10 in its pressing position and the screen plate 4 in its filling and at the same time its pressing position are situated at a prescribed distance from one another and thus define axially a pellet chamber 20 of prescribed volume. The piston rod 9 extends upwardly from the servo motor 13 and is provided on its upper end with a screwthread, which carries a stop nut 21 and a locking nut 22. The stop nut 21 and the upper cylinder cover 23 of the servo motor 13 form a stop 1, 23, the said stop limiting the movement of the screen plate 10 towards the screen plate 4 and thus determining the prescribed spacing of the screen plate 10 from the screen plate 4 in the pressing position of the said two screen plates. The screen plate 10 is adapted to be secured in its pressing position by means of the servo motor 13. The piston rod 9 and thus the screen plate 10 are held fast against turning movement in relation to the cylinder 2 by a tongue and also a groove which is arranged inside the servo motor 13 and is not visible in the drawing.

For the ejection of the pellet from the cylinder 2, the screen plate 4 is movable in the direction towards the pellet chamber 20 and beyond its pressing position into an ejection position. In the ejection position of the screen plate 4, the upper edge thereof is situated in the region of the rim of the opening 17 in the cylinder 2. The movement of the screen plate 4 away from the pellet chamber 20 is limited by a stop 24, 25 formed by the servo motor piston 24 and by the lower cylinder cover 25 of the servo motor 16, and thus the pressing position of the screen plate 4 is determined. The ejection position of the screen plate 4 is determined in known manner by a stop which is not shown in the drawing and which limits the movement of the servo motor piston 24, towards the end wall 3 of the cylinder 2. The screen plates 4, 10 each comprise a highly gas-permeable filter element 26 on their end surfaces facing the pellet chamber 20, the said filter elements being made of nylon fabric. The filter elements could also be constructed as woven fabrics consisting of plastic fibres, as sintered plates of material, more especially metal, or in similar manner. The screen plates 4, 10 are provided with packings 27 on their peripheral surfaces.

The bushing 7 comprises a lateral inlet opening 28 for material, said opening extending obliquely downwards from outside into the interior, a material inlet pipe 29 with a hopper 30 being associated with said opening.

The cylinder comprises lateral journals 31, 32, which are mounted in bearing heads 33, 34 of piston rods 35, 36 belonging to servo motors 37, 38 which are mounted in the base plate 1 and can be acted upon at both ends, the said cylinder being turnable about the axes of the journals 31, 32 and being fixedly mounted axially of the journals. The journal 32 carries a worm wheel 39 which is keyed to it and in which engages a worm 41 which is mounted in a support 40 fast in relation to the bearing head 34 and is fixed axially of said support. By means of the servo motors 37, 38, the cylinder 2 can be lowered into a position in which its opening 17 communicates with the surroundings. By means of the worm wheel 39 and the worm 41, the cylinder 2 lowered into the said position can be swung into a substantially horizontal position, in which the pellet can be reliably ejected.

The piston rod 9 is made hollow and the screen plate 10 comprises a corresponding central opening. Guided for axial displacement and turning movement inside the piston rod 9 is a stirrer shaft 42, which carries at its bottom end a stirrer blade 43 covering approximately the entire diameter of the cylinder 2 or bushing 7.

Bearing on the base plate 1 is a cylindrical frame 44 which encloses the servo motor 13 and the piston rod 9, the said frame having openings 45 in the axial region of the stop nut 21 and carrying an upper support plate 46 which comprises a central opening 47 receiving the stirrer shaft. Above the supporting plate 46, the stirrer shaft 42 is surrounded by a housing 48 bearing on the support plate. The stirrer shaft 42 is formed with a screwthread extending from its upper end downwardly into the region of the stop nut. The stirrer shaft 42 is surrounded by an internally threaded coupling nut 49 in the region between the supporting plate 46 and the stop nut 21. This coupling nut 49 has a large upper end surface, with which it bears against the supporting plate 46 in the position as shown in the drawing, and is reduced downwardly, so that it extends with the lower, reduced part into a cylindrical opening in the upper end of the piston rod 9, an annular space 50 of a small axial dimension being defined by the piston rod 9, the coupling nut 49 and the stirrer shaft 42. This annular space 50 houses a compression spring 51. The piston rod 9 is held fast in rotation with respect to the coupling nut 49 by a pin 52, which pin is movable in a slot 53 of small axial length and parallel to the axis of the piston rod, so that the coupling nut can be moved by a small amount axially in relation to the piston rod. The coupling nut 49 carries a downwardly extending pointer 54, of which the free end is disposed above an axial scale 55 on the stop nut 21 and by which the pressing position of the screen plate 10 can be determined.

Above the supporting plate 46, the stirrer shaft 42 is enclosed by a worm wheel 56 bearing with a central bore on the external surface of the threaded profile of the shaft. The said wheel is fast in rotation with the stirrer shaft 42 by means of a key 57 and key track 58 and is held axially in relation to the supporting plate by means of spacer bushings 59, 60, which bear with their central bores on the external surface of the threaded profile of the stirrer shaft 42, the key 57 at the same time also being held axially. Fixed on the side wall of the housing 48 is an electric motor 61 which operates at will in two directions of rotation and which has a horizontal driven shaft 62, on which is mounted a worm which meshes with the worm wheel 56, said worm not being visible in the drawing, as it is concealed by the worm wheel 56. The stirrer shaft 42 carries at its upper end an axially fast switch cam 63, which co-operates with an upper switch contact 64 and a lower switch contact 65.

Extending through the wall of the bushing 7 is a flushing air pipe 66 which can be connected to a compressed air source, the said pipe extending into the chamber between the cover 8 and the screen plate 10. A flushing air pipe 67 which can be connected to a compressed air source leads through the wall of the cylinder 2 into the chamber between the end wall 3 and the screen plate 4, a shut-off valve 68 being connected into the said pipe 67.

The permeability cell which is illustrated operates as follows. With all the parts in the positions as shown in the drawing, the motor 61 is operated in one direction of rotation, the worm wheel 56 being turned, this turning movement being transmitted through the key 57 to the stirrer shaft 42. Since the coupling nut 49 surrounding the thread of the stirrer shaft is fast with the piston rod 9 for rotational movement, the stirrer shaft 42 moves downwardly together with the stirrer blade 43 until the switch cam 63 has actuated the lower switch contact 65, whereby the motor 61 is stopped. A prescribed and accurately weighed quantity of material for testing is then introduced into the hopper 30 and passes through the supply pipe 29 and the supply opening 28 into the chamber defined by the cylinder 2 and the bushing 7. Throughout the entire period that the prescribed quantity of material is passing into this chamber, the motor 61 is now operated in the reverse direction, and the stirrer shaft 42 with the stirrer blade 43 are now rotated in the opposite direction and are moved upwardly. By extremely simple switching measures, it is possible for the motor 61 to drive the stirrer shaft and stirrer blade in the downward movement at twice the speed by comparison with the upward movement. The material reaching the chamber defined by the cylinder 2 and the bushing 7 is well distributed and largely homogenised by the rotating stirrer blade 43. When the stirrer shaft reaches the upper position, the switch cam 63 actuates the upper switch contact 64, whereby the motor 61 is stopped.

The screen plate 10 is now moved by means of the servo motor 13 towards the screen plate 4. The upwardly directed annular surface of the piston rod 9 which faces the annular chamber 50 is thereby moved away from the lower annular surface of the coupling nut 49 which is again facing the annular chamber 50, and the compression spring 51 is detensioned until the pin 52 has reached the upper end of the slot 53. With a continued downward movement of the piston rod 9, the coupling nut 49 and with it the stirrer shaft 42 with the stirrer blade 43 are carried along.

When the stop nut 21 contacts the upper cylinder cover 23 of the servo motor 13, the movement of the screen plate 10 towards the screen plate 4 has ended and the screen plate 10 is disposed in its pressing position according to the dash-dotted line 19, the screen plates 4, 10 axially limiting the pellet chamber 20 of a prescribed volume. During the movement into this pressing position, the screen plate 10 has compressed the prescribed quantity of test material into a substantially homogenous pellet of prescribed dimensions. The permeability measurement can now be carried out, and throughout the entire duration thereof, the screen plate 10 is held by means of the servo motor 13 in its pressing position. The measuring gas pipe 6 is connected to a quantity-measuring device which is under vacuum, in order to measure the gas quantity flowing through the permeability cell. Ambient air then flows through the inlet pipe 29 into the interior of the bushing 7 and downwardly in an axial direction through the screen plate 10, through the filter element 26, of the latter through the test pellet, through the filter element 26 of the screen plate 4, through the latter and then through the measuring gas pipe 6 to the quantity-measuring device, the period of time for the flow of a prescribed quantity of gas through the permeability cell being measured in known manner, and from this measurement result, the specific surface of the material being tested can be determined. As already mentioned, the screen plate 10 is held in its pressing position throughout this entire measuring operation. In this way, it is ensured that the test pellet, from the time it is compressed to the prescribed size and until the completion of the measurement of the time required for the prescribed quantity of measuring gas to flow through, its dimensions and thus also its porosity are maintained, this providing accurate measurement results.

After completing the measurement, the screen plate 10 is moved by the servo motor 13 again into its filling and withdrawal position. At the same time, the stirrer shaft 42 is also carried upwardly until the coupling nut 49 is again urged by the compression spring 51 against the carrying plate 46. The cylinder 2 is then moved downwardly by means of the servo motors 37, 38 to such an extent that it can be swung by means of the worm 41 and the worm wheel 39 about its journals 31, 32 into an approximately horizontal position whereafter, by movement of the screen plate 4 by means of the servo motor 16 towards the pellet chamber 20, the pellet is ejected from the cylinder 2 in its ejection position situated in the region of the opening 17 of the cylinder 2. In order to make possible the lowering and the swivelling of the cylinder 2, the connecting pipe between the gas discharge pipe 6 and the quantity measuring device is made flexible.

After the test pellet has been ejected, the flexible flushing air pipes 66, 67 are connected to a compressed air source and any residues which may still be present in and on the filter elements 26 are removed by a blowing action by means of the compressed air. By means of the shut-off valve 68 included in the flushing air pipe 67 of the cylinder 2, the channel defined by this flushing air pipe 67 is closed during the measurement of the gas throughflow time, since only air flowing through the pellet and coming from inside the cylinder 2 should reach the quantity-measuring device during this phase.

By the measures according to the invention, a reliable removal of practically all the substance in the test pellet from the permeability cell is possible, whereby a correct measurement result is obtained in the following measuring operation, and at the same time the dust formation in the surroundings during ejection of the pellet is quite considerably reduced. An additional advantage of the permeability cell as illustrated consists in that a pellet of high homogeneity can be prepared in said cell and that consequently a pellet of practically any desired size can be pressed, so that the different test samples being investigated are representative in every case for the whole quantity of product being examined by one measurement. The permeability cell as illustrated is suitable for determining the specific surface of pulverulent material in any branch of industry, and more especially in the cement industry for checking the crude cement flour and the cement, but also in foundry installations for checking the moulding sand, as well as in the ceramics industry and in comparable fields.

What is claimed is:

1. In a permeability measuring apparatus, a cell for receiving a prescribed weight of test material in powder form to be pressed into a pellet of prescribed volume comprising in combination:
    (a) a base plate;
    (b) a hollow cylinder, closed at the lower end and open at the upper end, mounted beneath the base plate and arranged to receive the test material;
    (c) a lower screen plate extending entirely across said cylinder perpendicular to the cylinder axis and shiftable axially between two limiting positions, namely a pressing position situated near the lower end of the cylinder and an ejection position in which the upper face of the plate is in the region of the upper end of the cylinder;
    (d) means connected to the plate to shift it between said positions;
    (e) an upper screen plate of the same size as the lower screen plate, mounted on the base plate coaxially and parallel with the lower screen plate and shiftable axially of the cylinder between a filling position, in which it is above the upper end of the cylinder, and a pressing position, in which it is in the cylinder and spaced a prescribed distance above the lower screen plate;
    (f) means for supplying test material to the open end of the cylinder when the lower screen plate is in pressing position and the upper screen plate is in filling position;
    (g) flow connections to said cylinder above and below the upper and lower screen plates when they are in pressing position; and
    (h) means for measuring gas flow through said connections and the test material between the screen plates.

2. The combination defined in claim 1 which comprises a stirrer blade for homogenizing the material to be tested before its being pressed, arranged between said screen plates coaxially with said cylinder, extending perpendicularly to the cylinder axis and covering approximately the entire internal diameter of said cylinder; said stirrer blade having a driving shaft extending upwardly so as to penetrate said upper screen plate and mounted for rotation about the cylinder axis while being axially shiftable; means for rotating and axially moving said shaft so as to displace said stirrer blade within the space left between said upper and lower screen plate.

3. The combination defined in claim 2 which comprises means for the synchronous axial displacement of the upper screen plate and the stirrer blade axially adjacent one another.

4. The combination defined in claim 1 which comprises a bushing mounted on said base plate coaxially with said cylinder in abutment upon its open end so as to serve as a guide for the upper screen plate; and means for lowering said cylinder away from said bushing and for swivelling said cylinder about a horizontal axis so as to allow ejection of the tested pellet of material.

References Cited

UNITED STATES PATENTS

| 2,365,496 | 12/1944 | Shaw. | |
| 2,534,718 | 12/1950 | Leas et al. | 73—38 |
| 3,039,293 | 6/1962 | Reddick et al. | 73—38 |
| 3,055,208 | 9/1962 | Gallus | 73—61.4 |

LOUIS R. PRINCE, *Primary Examiner.*

WILLIAM A. HENRY II, *Assistant Examiner.*

U.S. Cl. X.R.

325—323; 328—162